358-84

2/24/87 OR 4,646,145

SR

United States Patent [19]

Percy et al.

[11] Patent Number: 4,646,145

[45] Date of Patent: Feb. 24, 1987

[54] TELEVISION VIEWER REACTION DETERMINING SYSTEMS

[75] Inventors: Penelope C. Percy; Roger D. Percy, both of Seattle, Wash.

[73] Assignee: R. D. Percy & Company, Seattle, Wash.

[21] Appl. No.: 138,058

[22] Filed: Apr. 7, 1980

[51] Int. Cl.[4] .............................................. H04N 7/10

[52] U.S. Cl. ........................................ 358/84; 358/86; 455/2; 455/5; 379/53

[58] Field of Search .................... 358/84, 86, 122, 114; 455/2, 5; 179/2 TV; 235/51

[56] References Cited

U.S. PATENT DOCUMENTS

| | | | |
|---|---|---|---|
| 2,766,374 | 10/1956 | Hoffman | 358/84 |
| 3,733,430 | 5/1973 | Thompson et al. | 358/084 |
| 3,947,624 | 3/1976 | Miyake | 358/84 |
| 3,950,618 | 4/1976 | Bioisi | 179/2 AS |
| 3,987,397 | 10/1976 | Belcher et al. | 455/2 |
| 4,308,554 | 12/1981 | Percy et al. | 358/084 |

FOREIGN PATENT DOCUMENTS

| | | | |
|---|---|---|---|
| 48-76417 | 10/1973 | Japan . | |
| 1389717 | 4/1975 | United Kingdom . | |
| 1536414 | 12/1978 | United Kingdom | 455/2 |

*Primary Examiner*—James J. Groody
*Assistant Examiner*—Edward L. Coles
*Attorney, Agent, or Firm*—Benoit Law Corporation

[57] ABSTRACT

Television viewer reaction determining systems generate distinct signals indicative of different viewer reactions to television programs. These systems generate a further signal identifying any of the mentioned distinct signals as indicative of a viewer reaction to an unspecified person appearing in any video program. The mentioned distinct and further signals are gathered, and the unspecified person is identified from such gathered signals. The gathering of the mentioned signals is preferably effected in real time within a tolerance corresponding to an average rate of change of persons appearing in the video programs.

81 Claims, 7 Drawing Figures

VIEWER RESPONSE PRINTOUT

20 MARCH 1980

| | | | | | BUTTONS ACTIVATED | | | | | | | | | | | | | | | |
|---|---|---|---|---|---|---|---|---|---|---|---|---|---|---|---|---|---|---|---|---|
| PRODUCT | STATION | PROGRAM | TIME | VIEWER I.D. | E | I | C | F | B | U | D | Z | PE | PI | PC | PF | PB | PU | PD | PZ |
| BRAND A | KOMO | ALL MY CHILDREN | 12:48:4Ø | ØØ8-2 | | | | 1 | | | | | | | | | | | | |
| BRAND B | KIRO | AS THE WORLD TURNS | 13:26:59 | ØØ8-2 | | | | | | | | | | | 1 | | | | | |
| | KOMO | ONE LIFE TO LIVE | 13:32:14 | 178-4 | | | | | | | 1 | | | | | | | | | |
| | | | | 182-2 | | | | | | | | | | | | 1 | | | | |
| BRAND X | KSTW | MV-FRATERNITY ROW | 14:12:13 | 1Ø2-2 | | | | | | | | 1 | | | | | | | | |
| | | | | 1Ø8-4 | | | | | | | | 1 | | | | | | | | |
| BRAND Y | KING | SUPERTRAIN | 22:32:Ø4 | ØØ8-1 | | | | | | | | | | | | | | | | 1 |
| BRAND Z | KIRO | THE GUIDING LIGHT | 23:35:48 | ØØ8-3 | | | | | | 1 | | | | | | | | | | |

FIG. 7

TELEVISION VIEWER REACTION DETERMINING SYSTEMS

BACKGROUND OF THE INVENTION

1. Field of the Invention

The subject invention relates to audience survey and response systems, to broadcast audience survey and response systems, to television viewer survey and response systems and, more specifically, to systems for determining viewing habits of television viewers and television viewer response and reaction.

2. Disclosure Statement

This disclosure statement is made pursuant to the duty of disclosure imposed by law and formulated in 37 CFR 1.56(a). No representation is hereby made that information thus disclosed in fact constitutes prior art inasmuch as 37 CFR 1.56(a) relies on a materiality concept which depends on uncertain and inevitably subjective elements of substantial likelihood and reasonableness, and inasmuch as a growing attitude appears to require citation of material which might lead to a discovery of pertinent material though not necessarily being of itself pertinent. Also, the following comments contain conclusions and observations which have only been drawn or become apparent after conception of the subject invention or which contrast the subject invention or its merits against the background of developments subsequent in time or priority.

Television in the United States and some other countries has been in serious danger of becoming a medium for delivering masses to advertisers. The networks' obsession with rating points has led to programing for the lowest common denominator. Any television program with less than a 30 percent share of the Nielson television audience is in trouble, and is likely to be cancelled, even though it has 10 to 15 million faithful viewers. This blind reliance on a cut-off point makes television the only medium in history which considers a regular audience of tens of millions to be a failure.

By way of contrast, other media have lately become increasingly specialized and narrowly focused on particular audiences. This, for instance, applies to radio programing designed to attract special or particular audiences here and there, to the current profusion of magazines devoting themselves to the special interests of relatively small groups of readers, and even to metropolitan newspapers which have been introducing zoned editions, targeted to readers and advertisers in specific neighborhoods. As long as the dominance of the current Nielson rating system persists, such a development is believed impossible for commercial television.

To put the problem succinctly, what has been in the way of more satisfactory and fairer television programing was the lack of an effective and efficient rating system that would respect television viewers not only in terms of their quantity, but also of their opinion on particular programs and on specific portions thereof and on commercials aired during program breaks.

Great strides in this respect have recently been made by the systems disclosed in U.S. Pat. Nos. 4,107,734 and 4,107,735, issued Aug. 15, 1978 to the subject assignee, and herewith incorporated by reference herein. Reference may also be had to the patent documents cited in the latter patents.

SUMMARY OF THE INVENTION

It is a general object of this invention to overcome the disadvantages and meet the needs expressed or implicit in the above disclosure statement or in other parts hereof.

It is a related object of this invention to provide improved audience survey systems.

It is a germane object of this invention to provide improved television viewer survey systems and, more specifically, improved systems for determining viewing habits of television viewers and television viewer reaction.

It is a related object of this invention to provide television viewer response systems with a specific identification facility, including an identification of individual reacting viewers and an identification of persons appearing in video programs to which a viewer reaction pertains.

It is also a general object of this invention to contribute to an upgrading of television programing.

It is a germane object of this invention to provide a program rating system that is more qualitative in its content and impact, rather than being merely quantitatively oriented.

It is also an object of this invention to provide improved methods and apparatus for television audience survey systems.

It is a further object of this invention to encourage increased and more meaningful viewer participation.

Other objects will become apparent in the further course of this disclosure.

From a first aspect thereof, the subject invention resides in methods and apparatus for determining viewer reaction to video programs including persons displayed by different video display sets. The invention according to this aspect resides, more specifically, in the improvement comprising in combination the steps of, or means for, distinctly indicating different viewer reactions to the programs, generally classifying part of the viewer reactions as reactions to unspecified displayed persons, gathering the viewer reactions, and identifying the unspecified displayed persons from the gathered viewer reactions. Switching devices may be provided for receiving different reactions to the programs, and such switching devices are employed for distinctly indicating different viewer reactions to the video programs. This feature may also be employed in the methods according to the further aspects of this invention. Signals mentioned below in connection with aspects of this invention may be electric signals.

From a further aspect thereof, the subject invention resides in methods and apparatus for determining viewer reaction to video programs displayed by different video display sets. The invention according to this aspect resides, more specifically, in the improvement comprising in combination the steps of, or means for, providing on/off type push buttons, distinctly indicating viewer reactions originating with individual viewers, and specifically identifying the viewer reactions in terms of the individual viewers by having viewers selectively actuate more than one of said push buttons at a time.

From another aspect thereof, the subject invention resides in methods and apparatus for determining viewer reaction to video programs including persons displayed by different video display sets, and, more specifically, resides in the improvement comprising the steps of, or means for, generating distinct signals indicative of different viewer reactions to said programs, generating a further signal identifying any of said distinct signals as indicative of a viewer reaction to an unspecified displayed person, gathering said distinct and further signals and identifying said unspecified person from said gathered signals.

From another aspect thereof, the subject invention resides in methods and apparatus for determining viewer reaction to video programs displayed by different video display sets, and, more specifically, resides in the improvement comprising in combination the steps of, or means for, generating distinct signals indicative of different viewer reactions to said programs, generating a further signal identifying any of said distinct signals as originating with a particular viewer and gathering said distinct and further signals essentially in real time.

From another aspect thereof, the subject invention resides in methods and apparatus for determining viewer reaction to video programs broadcast over different television channels and displayed by different video display sets, and, more specifically, resides in the improvement comprising in combination the step of, or means for, distinctly indicating viewer reactions originating with individual viewers, determining for each viewer reaction the channel over which the program watched by the particular viewer is being broadcast specifically identifying said viewer reactions in terms of said individual viewers and television channels and gathering said viewer reactions essentially in real time.

From another aspect thereof, the subject invention resides in methods and apparatus for determining viewer reaction to video programs including persons displayed to participating viewers by different video display sets, and, more specifically, resides in the improvement comprising in combination the steps of, or means for, distinctly indicating viewer reactions originating with individual viewers, specifically identifying said viewer reactions in terms of said individual viewers, generally classifying part of said viewer reactions as reactions to unspecified persons, and identifying said unspecified persons from said classified part of said viewer reactions.

From another aspect thereof, the subject invention resides in methods and apparatus for determining viewer reaction to video programs including persons displayed by different video display sets, and, more specifically, resides in the improvement comprising in combination the steps of, or means for, generating distinct signals indicative of different viewer reactions to said programs, generating a first further signal identifying any of said distinct signals as originating with a particular viewer, generating a second further signal identifying any of said distinct signals as indicative of a viewer reaction to an unspecified displayed person and identifying said unspecified persons from said second further signals.

From another aspect thereof, the subject invention resides in methods and apparatus for determining viewer reaction to video programs including persons and being broadcast over different television channels and displayed by different video display sets, and, more specifically, resides in the improvement comprising in combination the steps of, or means for, distinctly indicating viewer reactions originating with individual viewers, determining for each viewer reaction the channel over which the program watched by the particular viewer is being broadcast, generally classifying part of said viewer reactions as reactions to unspecified persons and specifically identifying said viewer reactions and unspecified persons in terms of said individual viewers and said television channels.

From another aspect thereof, the subject invention resides in methods and apparatus for determining, in terms of different criteria, viewer reaction to video programs displayed by different video display sets, and, more specifically, resides in the improvement comprising in combination the steps of, or means for, providing a number of possible types of viewer reactions and indicating viewer reactions in terms of said possible types, providing distinct first signals representative of said indicated viewer reactions in terms of a first criterion and providing distinct second signals representative of said indicated viewer reactions in terms of a second criterion, including the step of expressing said second signals in terms of a reaction to the performance of a person displayed in one of said video programs.

From another aspect thereof, the subject invention resides in methods and apparatus for determining viewer reaction to video programs displayed by different video display sets, and, more specifically, resides in the improvement comprising in combination the steps of, or means for, providing a plurality of input devices for selective actuation by viewers, having viewers selectively actuate said input devices, one at a time, to indicate different first viewer reactions and having viewers selectively actuate said input devices, more than one at a time, to indicate different second viewer reactions.

From another aspect thereof, the subject invention resides in apparatus for determining viewer reaction to video programs displayed by different video display sets, and, more specifically, resides in the improvement comprising means for distinctly indicating viewer reactions originating with individual viewers and means combined with said indicating means including on/off-type push buttom means for specifically identifying said viewer reactions in terms of said individual viewers.

From another aspect thereof, the subject invention resides in apparatus for determining viewer reaction to video programs displayed by different video display sets, and, more specifically, resides in the improvement comprising in combination a plurality of input devices for selective actuation by viewers, means connected to said input devices for indicating different first viewer reactions in response to actuation of said input devices, one at a time and means connected to said input devices for indicating different second viewer reactions in response to actuation of more than one of said input devices at a time.

From another aspect thereof, the subject invention resides in a unit for receiving viewer reactions to video programs, and, more specifically, resides in the improvement comprising in combination a series of switching devices for receiving a number of possible types of viewer reactions and a further switching device for indicating that any of said viewer reactions is a reaction to a person appearing in any of said video programs.

Further and different aspects of the subject invention are disclosed in the description of preferred embodiments.

BRIEF DESCRIPTION OF THE DRAWINGS

The subject invention and its various objects and aspects will become more readily apparent from the following detailed description of preferred embodiments thereof, illustrated by way of example in the accompanying drawings, in which like reference numerals designate like or functionally equivalent parts, and in which:

FIG. 7 is a simplified version of a viewer response printout produced by the equipment shown in FIGS. 1 to 6 according to a preferred embodiment of the subject invention.

DESCRIPTION OF PREFERRED EMBODIMENTS

Figure 1:
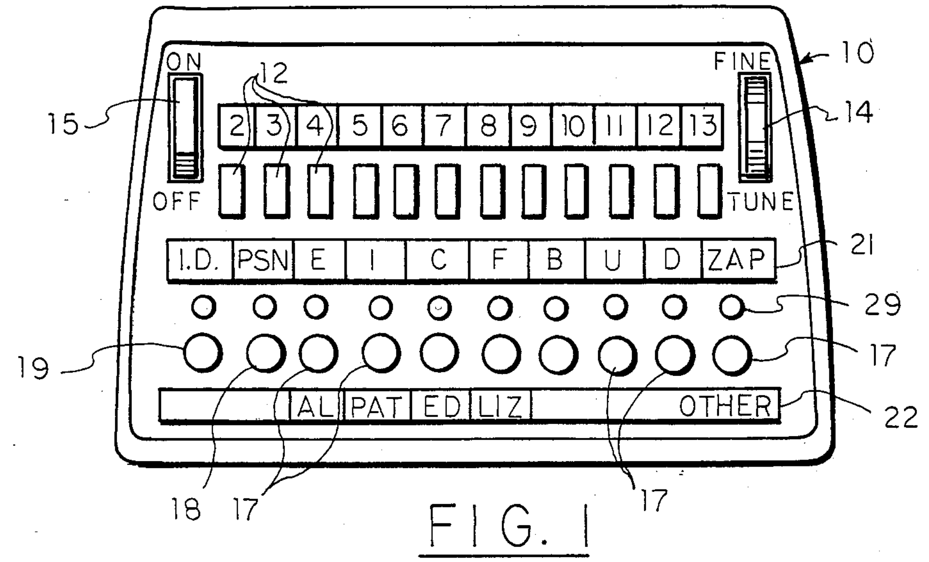
FIG. 1 is a top view of a viewer reaction inputting unit according to a preferred embodiment of the subject invention.

The unit or console 10 shown in FIGS. 1 to 4 may be a part of a remote control which is preferably positioned across the room from a television set, or at the preferred and most comfortable viewing position, for conveniently effecting channel selections and other control functions relative to the particular video display set. Reference may in this respect be had to the above mentioned commonly owned U.S. Pat. Nos. 4,107,734 and 4,107,735 incorporated by reference herein, and showing, for instance, various television broadcast stations, a video or television broadcast display set in a multichannel broadcast reception area and a remote control with channel selection, sound control and viewer response receiving system.

The illustrated unit 10 accordingly includes means for selecting video program transmission channels or channel tuning facilities for the video programs to be displayed and reacted to. In particular, the unit 10 includes push buttons 12 for individually selecting VHF channels 2 to 13. A fine tuning facility 14 is also provided in addition to an ON-OFF switch 15 for the unit and for the television set.

If desired, the unit 10 may also be equipped with a UHF or any other channel selection facility. Within the broad scope of the subject invention, the VHF, UHF or other program selection facility need not be part of the unit 10, but may be located at the corresponding television set or elsewhere, depending on the needs and goals of the system.

On the other hand, the unit 10 may be equipped with additional controls (not shown) for such parameters as volume, brightness, hue, etc.

The unit 10 for receiving viewer reactions to video programs includes a series of switching devices 17 for receiving a number of possible types of viewer reactions. By way of example, the illustrated embodiment provides for eight possible types of viewer reaction, including E for excellence, I for informative, C for credible, F for funny, B for boring, U for unbelievable, D for dumb, and ZAP for absolutely objectionable. A participating viewer is thus enabled to express his or her reactions to a displayed video program or its contents positively and negatively in multi-dimensional types of expression.

Often, a viewer wishes to express his reaction relative to a person appearing in a program. So far, this has not been practically possible, and much useful information therefore never reached the people responsible for creating or airing video programs.

According to the currently discussed aspect of the invention, the unit 10 includes a further switching device 18 for indicating that any of the viewer reactions is a reaction to a person appearing in any of the video programs, as more fully explained below.

Also in accordance with an aspect of the subject invention, the unit 10 includes a second further switching device 19 for indicating that any of the viewer reactions originates with identified viewers.

In this respect, it is within the scope of the subject invention that either the switching device 18 or the switching device 19 may be the only further switching device of the unit 10, or that both further switching devices 18 and 19 may be present as shown in FIGS. 1 et seq.

Also, while it is within the scope of the invention to employ different switching devices at 17, 18 and 19, on/off-type push buttons have been employed for this purpose in the illustrated preferred embodiment. A first label 21 designates for each push button 17 a corresponding one of the eight different types of viewer reaction. Similarly, the label 21 designates the further push button 18 as a person-reaction button PSN and the push button 19 as a viewer identification button I.D.

A second label 22 individually designates at least some of the switching devices or push buttons in the series 17 in terms of individual viewers using the unit 10. By way of example, and in terms of a participating household, the label 22 designates one of the push buttons 17 as pertaining to AL who is the father named Albert in the particular household. Another push button 17 is designated to PAT, who is the mother named Patricia in that household. Another push button 17 is dedicated to the son ED, and another push button 17 to the daughter LIZ. A further push button 17 is labeled as OTHER, indicating a response by any person other than Al, Pat, Ed and Liz.

A possible sequence of use of the unit 10 will now be explained with the aid of FIGS. 2 to 4. In particular, the user first switches the unit ON, as indicated at 15 in FIG. 2. This may at the same time turn ON the corresponding television set, which preferably is not turned on independently.

The user then selects a desired video channel by depression of one of the push buttons 12. For instance, the push button 12' may be depressed for channel 4.

The viewer identifies himself or herself by simultaneous depression of the I.D. button 19 and one of the dedicated buttons 17. For instance, the mother of the particular household may identify herself by simultaneously depressing with two fingers 23 and 24 the I.D. button 19 and the PAT button 17, as shown in FIG. 2. As more fully described below, the equipment thus takes note of the fact that responses following such identification are the responses of the mother of the household. In practice, this is important in evaluating video program performance and in optimizing the provision of programs of special interest and appeal to different age groups and other strata of society.

Figure 3:
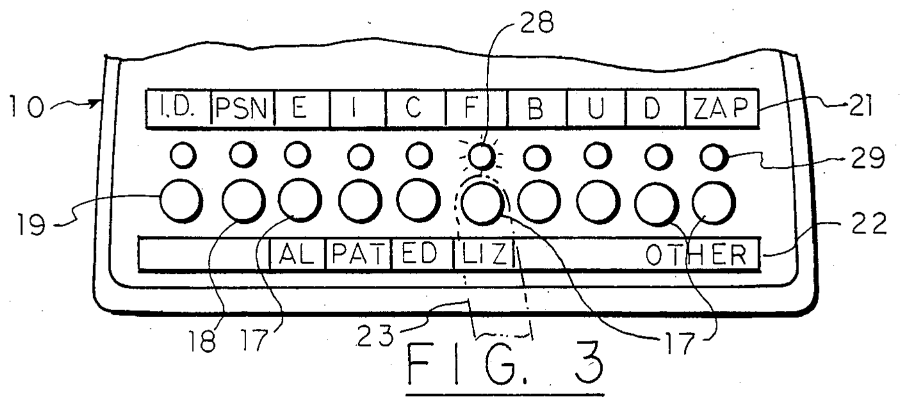
FIG. 3 is a fractional showing of the unit of FIG. 1, showing a phase of the operation thereof.

The identified mother may then express her views on the particular video program, such as by depressing the push button 17 under F with a finger 23, when she thinks that a particular part of the program or the program itself is funny (see FIG. 3). In this respect, while FIG. 7 draws a distinction between commercials, and programs themselves, the word "program" is employed herein and in the claims generically, as further mentioned below.

Figure 4:
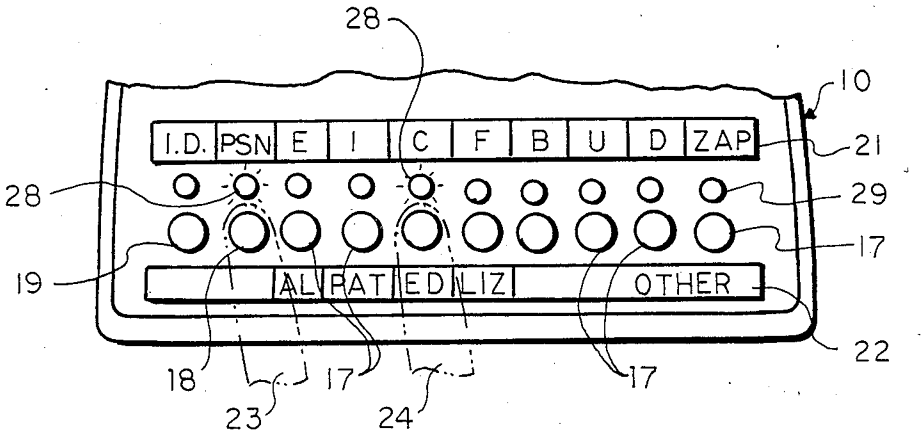
FIG. 4 is a view similar to FIG. 3, showing a special technique and facility for indicating a reaction to a specific person, according to a further embodiment of the subject invention.

According to FIG. 4, the identified mother may further express her opinion on a person appearing in the displayed program by simultaneously depressing with her fingers 23 and 24 the person button 18 and one of the reaction buttons 17. In this manner, the mother may, for example, credit a person appearing, for instance, in a commercial as being credible (C).

In practice, the implementation of the viewer response or reaction unit 10 may be similar to that of the viewer reaction unit shown in the above mentioned U.S. Pat. Nos. 4,107,734 and 4,107,735 incorporated herein. For instance, the push buttons 17 to 19 may be similar to the push buttons 25 to 28 shown in these patents, and the viewer reaction input circuitry 26 shown in FIGS. 5 and 6 may be similar to the corresponding circuitry shown in the upper part of FIG. 2 in the latter patents. The digital encoder shown in the lower part of that FIG. 2 may also be employed in the viewer reaction input circuitry 26 to indicate the tuning of the participating displayed set to any particular television channel.

Figure 5:
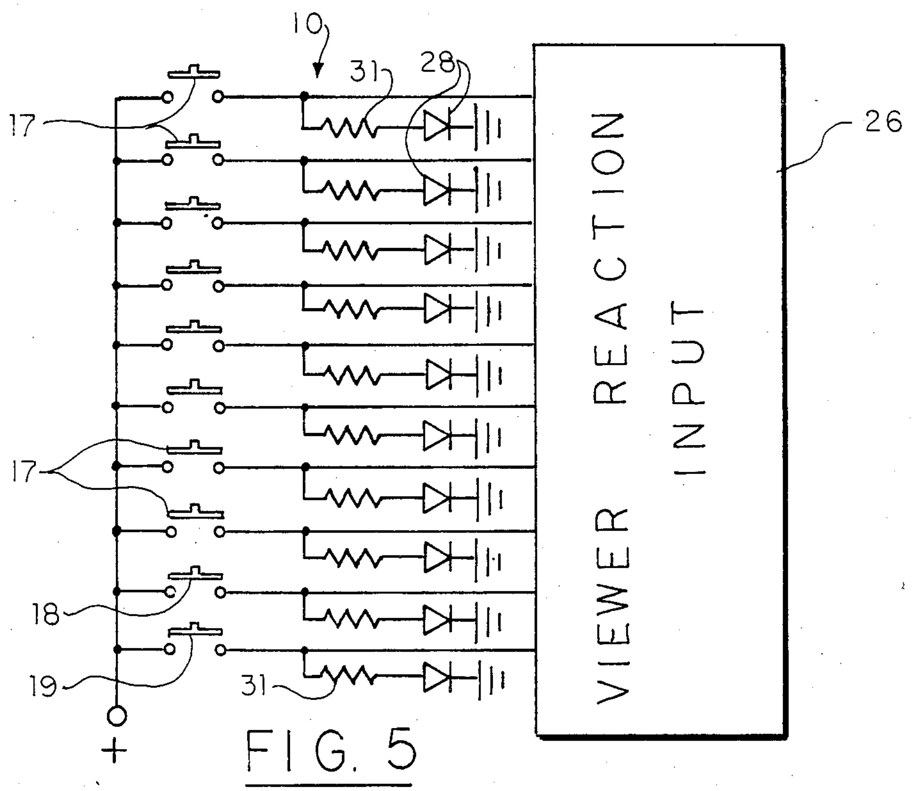
FIG. 5 is a schematic diagram of important parts of the circuitry of the unit shown in FIGS. 1 to 4.

According to FIG. 5, the illustrated unit 10 with associated input circuitry 26 does employ eight switching channels serviced by individual push buttons 17, for indicating the possible types of viewer reactions, one further switching channel serviced by the push button 18 for qualifying any reaction as a reaction to a person appearing in a program, and a still further switching channel serviced by the push button 19, for identifying any viewer reaction as the reaction of a designated person. These switching channels serviced by push buttons 17 to 19 may in principle be identical and separate in practice.

To assure a viewer of his or her proper actuation of push buttons 17 to 19, each switching channel or push button may be individually provided with a light-emitting diode (LED) or other signal lamp 28. The bank of signal lamps 29 thus provided is seen in FIGS. 1 to 4 in its individual association with the push buttons 18 to 19. As also seen in FIGS. 2 to 4, individual lamps 28 light up adjacent specific actuated push buttons. As seen in FIG. 5, LED's 28 may be individually connected to the push buttons through current limiting resistors 31.

Figure 2:
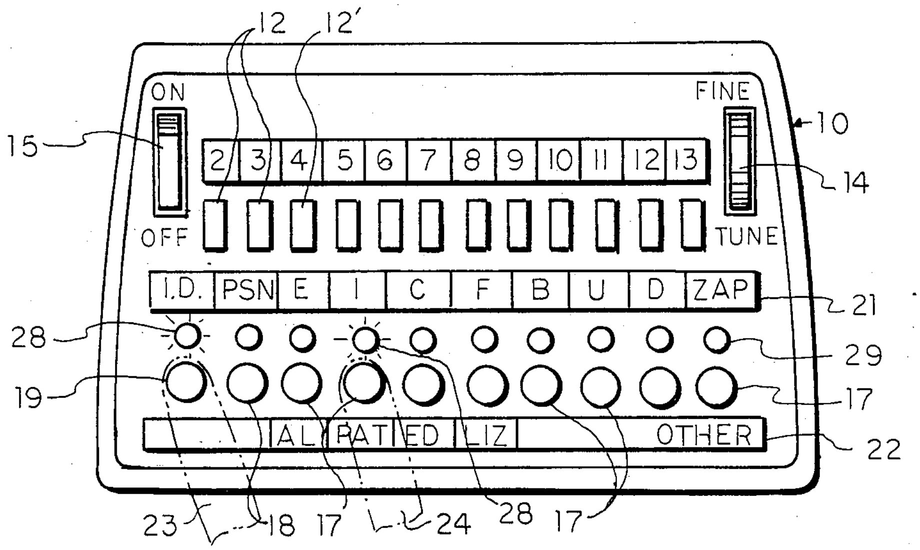
FIG. 2 is a view similar to FIG. 1, specifically showing a viewer identification technique or facility according to a preferred embodiment of the invention.
Figure 6:
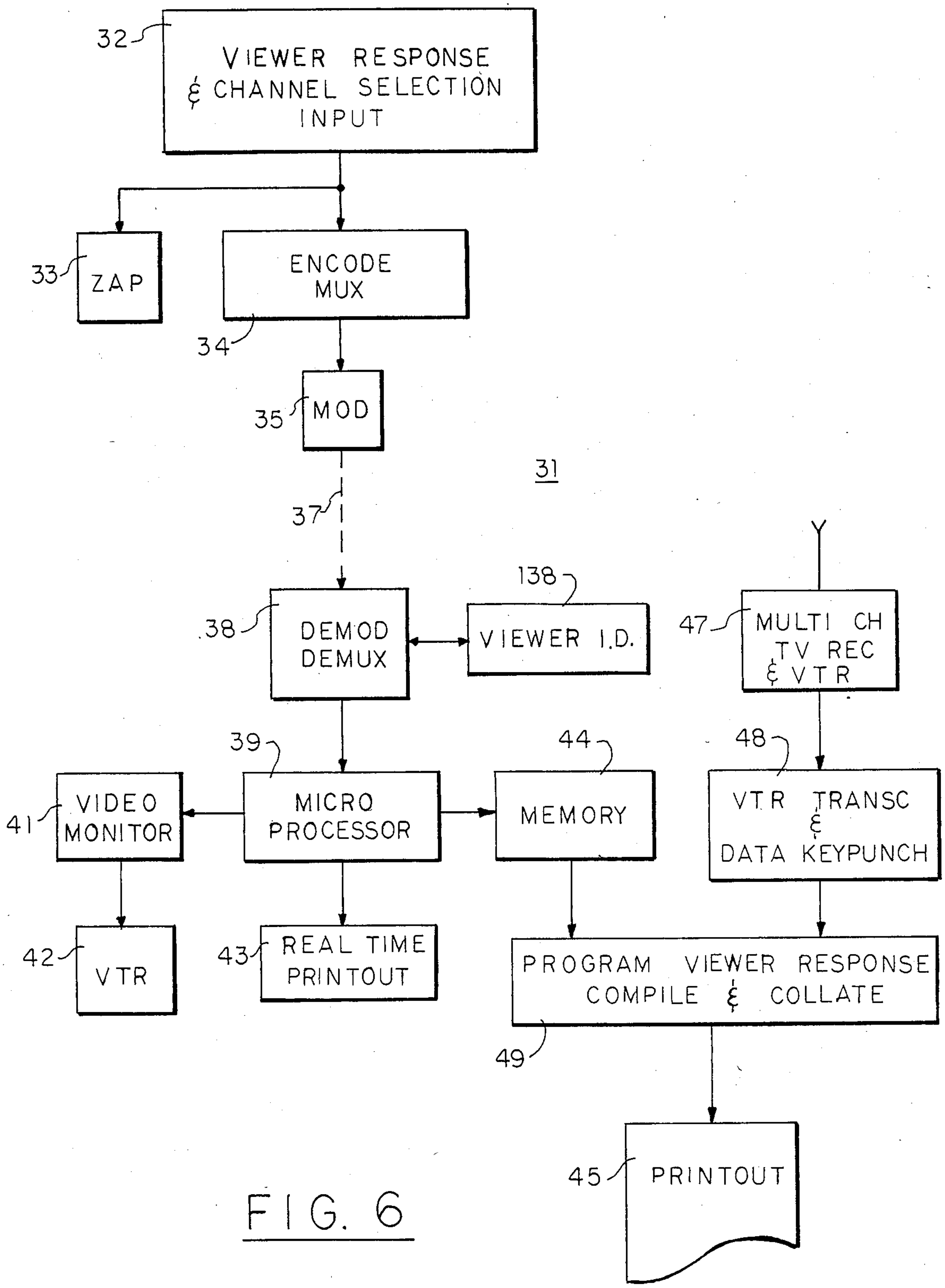
FIG. 6 is a block diagram of a viewer response or reaction processing system employing the unit shown in FIGS. 1 to 4.

The ten viewer response or reaction and identification channels shown in FIG. 5 may be handled by the system shown in FIG. 6 in essentially the same manner as the four viewer reaction channels shown at the top of FIG. 2 in the above mentioned U.S. Pat. Nos. 4,107,734 and 4,107,735. The viewer reaction and response processing system 31 may also include a channel for ascertaining the ON-OFF condition of the particular television set, as shown at 29 and 85 in the upper part of FIG. 2 of the latter patents, and a television channel sensing and encoding arrangement with binary outputs as shown at 65 to 67 and 71 to 74 in the lower part of that FIG. 2. The resulting viewer response or reaction and channel selection input apparatus, including the equipment shown in FIG. 5 hereof, is indicated at 32 in FIG. 6.

As indicated at 33 in FIG. 6, the system of the subject invention may also include equipment for altering the display of a television broadcast in response to actuation of the push button 17 labeled ZAP in the unit 10 shown in FIGS. 1 to 4. As explained in the above mentioned U.S. Pat. Nos. 4,107,734 and 4,107,735 with the aid of the upper parts of FIGS. 2 and 3, such ZAP reaction represents the ultimate in viewer dissatisfaction, resulting, for instance, in a temporary audio and visual blanking of loudspeaker and television screen.

As indicated at 34 in FIG. 6 and as diagrammatically shown at 76, 100 and 115 in FIG. 3 of the above mentioned U.S. Pat. Nos. 4,107,734 and 4,107,735, the viewer reaction identification and channel selection signals may be timed or encoded and multiplexed for modulation and transmission to the data processing center shown in the lower part of FIG. 6. By way of example, the modulator shown at 127 in FIG. 3 of the above mentioned U.S. Pat. Nos. 4,107,734 and 4,107,735 may be employed at 35 in the system 31 for preparing the multiplexed signals for transmission over a channel 37. In practice, such transmission channel may, for example, be a leased telephone line, a cable or wireless transmission channel, or a channel of a multiplexed transmission, to name some representative examples.

At the receiving end of the channel 37, the transmitted signals are demodulated and demultiplexed at 38. Reference may in this respect be had to the upper part of FIG. 5 and its corresponding description in the above mentioned U.S. Pat. No. 4,107,735 showing detection, demultiplexing and identification equipment for several transmission channels 37, 37' and 37".

As shown at 138 in FIG. 5 of the above mentioned U.S. Pat. No. 4,107,735 and in FIG. 6 hereof, the viewer reaction determining system also includes a viewer identification device or function which identifies the household or entity equipped with the particular responding unit 10 and which, in the system of the illustrated preferred embodiment of the subject invention, also identifies each reaction for which an I.D. button 17 has been depressed, as the reaction of the viewer particularly identified in the manner shown, for instance, in FIG. 2 hereof. All this can be conveniently handled in practice by the employment of codes designating particular participating households and individual viewers, as more fully explained below.

The viewer identification ascertained at 138 may be fed into a microprocessor 39 along with the demodulated and demultiplexed viewer reaction, identification, and ON-OFF determination signals. Reference may in this respect also be had to FIGS. 5 to 8 of the above mentioned U.S. Pat. No. 4,107,735. As shown at 41 and 42 in FIG. 6 hereof, and in FIGS. 4, 7 and 8 in the above mentioned U.S. Pat. No. 4,107,735, a video monitor and tape recorder may be employed for graphically displaying and recording viewer response or reaction. Such data may also be printed out in real time as indicated at 43 and stored in a memory for further processing as indicated at 44 in FIGS. 6 hereof. By way of example, and within the scope of the subject invention, such further processing may reside in the preparation of a detailed viewer response printout 45 of the type shown in FIG. 7.

To this end, the system 31 includes a multichannel television reception facility which preferably receives all television channels in the particular survey area. A video tape recording facility records or transcribes the received video programs, commercials and all other contents of each channel at 47. The various video channels are received and recorded at 47 in real time. Preferably, the system 31 includes a time date generator which continuously records the exact date and time at 47 right onto the video tape or other recording medium, so that the accurate time appears in each image field or frame when the recorded program is played back. Keypunch or other facilities may be employed at 48 to provide for each recording such channel identification, broadcast content and other data as may be helpful to the compiler and collator.

Data compilation and collation at 49 may be done electronically or with the aid of a person. From the memory 44, the compiler and collator also receive information about all viewer reactions and identification received at particular times. Each bit or other quantum of such information is accompanied by an indication of the exact time of its receipt, as well as an indication of the channel having been received at the set of the reacting viewer at the particular time.

By comparing the time-indicated viewer data received from memory 44 with the time-indicated broadcast data received from the recording facility 48, the compiler is able to place each viewer reaction within the essentially exact spot of the particular program which prompted that reaction. Accurate viewer response or reaction data may thus be compiled and collated at 49.

An example of a result of such compilation and collation is apparent in the viewer response printout shown in FIG. 7. In particular, FIG. 7, starting from the left-hand side, has a first column listing products advertised during, or in commerical breaks between, specific television programs. The second column of FIG. 7 lists the particular television channels or stations. The third column lists the particular television programs. In this respect, and in terms of the first and third columns of FIG. 7, a distinction is made between a program, on the one hand, and a commercial, on the other hand, with commercials being listed by brand name in the first or product column, and programs being listed by title in the third column of FIG. 7. Apart from such distinction, the word "programs" is, however, employed herein and in the claims generically to cover commercials, shows, and any other video presentation, observable display or broadcast.

The fourth column in FIG. 7 lists each time, down to the second, in which a particular viewer reaction was received. In this respect, it should be understood that viewer reactions preferably are received in essentially real time. In principle, this includes a system in which each viewer reaction is instantly transmitted to the memory 44. In practice, substantially instantaneous transmission of viewer reactions, such as once every second, have, however, been found satisfactory. According to a preferred embodiment of the subject invention, the system 31 gathers the viewer reactions in real time within a tolerance for corresponding to an average rate of change of persons appearing in a video program. In practice, this also ties in with an average person's reaction time, since it is unlikely that a viewer would meaningfully react to a person appearing for, say, less than a second.

The fifth column in FIG. 7 contains viewer identification data. For instance, each household or television set participating in a continuous viewer reaction or response survey may be designated by a three-digit number, if there are more than 100 and less than 1,000 participating households or sets. Accordingly, the fifth column of FIG. 7 contains responses from households Nos. 8, 102, 108, 178 and 182. Connected to each household number by a hyphen is a digit indicating the identity of the particular reaction viewer. By way of example, we may assume that the unit shown in FIGS. 1 to 4 hereof belongs to household No. 008.

We may further assume that the persons Al, Pat, Ed and Liz represented in the label 22 in FIGS. 1 to 4 have, respectively been allocated the I.D. numbers 1, 2, 3 and 4.

Further columns of FIG. 7 list buttons activated in terms of the above mentioned possible viewer reactions E to Z, signifying the action of any of the buttons 17, one at a time, as shown by way of example in FIG. 3. The remaining columns of FIG. 7 show buttons activated in terms of the possible viewer reactions to persons, PE to PZ, received in response to simultaneous actuation of the person button 18 and of any of the buttons 17 as shown, for instance, in FIG. 4, with Z and ZAP denoting the same reaction.

The operation of the disclosed system will now be further explained with the aid of the master printout 45. In particular, as indicated in the first data row of FIG. 7, a viewer reaction was received at 40 seconds after 12:48. Prior to inputting that reaction, the viewer identified herself as Pat by simultaneously depressing the viewer identification button 19 and the appropriate one of the general buttons 17 above the label PAT, as shown in FIG. 2.

The viewer reaction recorded in the first row of FIG. 7 then arose when Pat thought at the particular instant that the contents of a video display aired over station KOMO was funny. She thus depressed the F button 17, as shown in FIG. 3. That viewer reaction then was modulated and transmitted via line 37, to be demodulated and correlated to identifications of the particular viewer and channel viewed, transmitted along channel 37 previously or shortly preceding the actual viewer reaction.

As a result, the channel or station, time, viewer identification and viewer reaction data shown in the first row of FIG. 7 are printed out, such as with the real time printout 43. On the basis of such station and time information, the collator can keypunch at 48 or otherwise insert the name of the particular program and, if of interest, the name of the product advertised at the time. As a result, the data shown in the first row of FIG. 7 are compiled and printed out at 45.

As a result of the essentially real time gathering of the viewer reaction, and on the basis of the time data indicated in the first row of FIG. 7, the observer or user of the particular viewer response printout can tell that Pat did not actually react to the show "All my Children," but rather considered the commercial of the Brand A product as funny. This is very important, since other systems have tended to confuse viewer reaction among commercials and adjacent shows. In the past, such confusion has stood in the way of a meaningful improvement of television programing and commercial messages.

Turning now to the second data row of FIG. 7, we find that Pat, at a specific instant, was impressed by the credibility of a then appearing person, and registered such impression by actuating the button 18 and appropriate button 17 simultaneously, as shown in FIG. 4. As an important point, it will be noted in this respect that the unit 10 according to the illustrated preferred embodiment of the subject invention does not have any facility for registering the identity of the person to whom the viewer reacted.

In other words, while the label 22 identifies participating viewers at the location of the particular unit 10, no such identification is provided for persons reacted to. In fact, such an identification would severely limit the number of persons to which viewers could react, and it would be outright impossible in practice to provide any meaningful list of persons appearing in various television programs, commercials or other displays.

As a solution to this heretofore overwhelming problem, the illustrated preferred embodiment of the subject invention does not at the unit 10 specify the person to whom a viewer is reacting when depressing the button 18. Rather, the unit 10 classifies part of the viewer reactions E to ZAP as reactions to unspecified displayed persons in response to simultaneous actuation of the push button 18 and an appropriate push button 17. The system 31 then gathers viewer reactions, and identifies the unspecified displayed persons from such gathered viewer reactions. The specifically disclosed system effects such identification of unspecified persons by means or with the aid of a gathering of the viewer reactions essentially in real time, such as within a tolerance corresponding to an average rate of change of persons displayed in video programs. According to a preferred embodiment of the subject invention, exemplified in FIG. 6, the identifying step includes a timewise comparison of (a) viewer reactions to unspecified persons to (b) video programs in a broad sense.

By checking on the time monitor at 47, the user of the viewer response printout of FIG. 7 can tell from the time and other data indicated in the second row of FIG. 7 that Pat responded to one John Abner who appeared in a commercial of Brand B and who at 59 seconds after 13:26 creditably made a rather credible statement about that product, in the opinion of Pat. A larger number of responses of this type may encourage sponsors to put on more credible commercials, resulting eventually in more satisfactory marketing techniques.

Turning now to the third row of FIG. 7, we find that viewer number 4 in participating household number 178 considered a specific presentation at 14 seconds after 13:32 as dumb. In a practical situation, close scrutiny of the particular time would indicate that the viewer could not have reacted to a commercial since "One Life to Live" had already started moments before. Accordingly, what might erroneously have been interpreted as an adverse reaction to a commercial, turns out to have been an adverse reaction to the show itself. From an expansion of the particular third row, we also learn that viewer number 2 in household number 182 considered a person appearing in the show at the particular instant as being funny. From data available about the participating viewer numbers 2 and 4, such as respective ages and other differences, it may with a sufficiently large sample collected over weeks eventually be possible to identify programs which appeal to particular groups.

The subject invention thus enables the important transfer of special interest programing to commercial television in a manner not heretofore possible.

The fourth data row in FIG. 7 shows that two viewers reacted to a commercial of Brand X with the disgusted outcry ZAP. Given a large enough sample, this should have the beneficial effect of convincing the particular manufacturer to improve its performance or get off the air. At the same time, the subject invention saves the otherwise good movie "Fraternity Row" since the user or compiler of the particular printout can tell that the commercial of Brand X, rather than the motion picture "Fraternity Row," was aired at 13 seconds after 14:12.

At 4 seconds after 22:32, a disgusting character in a commercial of Brand Y drew the utmost negative reaction "Person ZAP" from Al who was watching the series "Supertrain" at about that time. Again, on the basis of the essentially real time data gathering by the subject system, and the real time printout thereof, the evaluator of the viewer response printout can identify the particular person reacted to, thereby helping the particular actor to improve his performance or the screenwriter in terms of his characterization.

According to the last row of FIG. 7, the son Ed indicated his finding that a commercial of Brand Z was unbelievable. Given a large enough sample, this may eventually indicate to sponsors and marketing people that the younger generation requests more credibility in the advertisement and marketing of a product. Again, the effect may be rather beneficial to consumers at large.

In terms of the illustrated equipment and in general, the subject invention, from one aspect thereof, resides in methods and apparatus for determining viewer reaction to video programs including persons displayed by different video display sets. The invention according to this aspect resides in the combination of distinctly indicating different viewer reactions to the programs, such as by means of push buttons 17, generally classifying part of the viewer reactions as reactions to unspecified displayed persons, such as by means of a push button 18, gathering the viewer reactions, such as by means of the system 31, and identifying the unspecified displayed persons from the gathered viewer reactions. As disclosed above, the identification of unspecified persons proceeds primarily by means of a gathering of the viewer reaction in real time within a tolerance corresponding to an average rate of change of the persons in the video programs. As explained with the aid of blocks 44, 47, 48 and 49 in FIG. 6, the identification of unspecified persons reacted to is preferably effected by means of a comparison of (a) the reactions to unspecified persons timewise to (b) video programs received over a multi-channel television receiver 47.

The viewer reaction indicating step preferably includes a provision of a number of possible types of viewer reactions and an indication of viewer reactions to displayed programs in terms of these possible types. For instance, the indicating means or unit 10 includes push buttons 17 for indicating viewer reactions to displayed programs in terms of a number of possible types of viewer reactions E to ZAP.

A further push button 18 is employed for generally classifying part of the viewer reactions as reactions to unspecified displayed persons in terms of the latter viewer classification types E to ZAP.

In the illustrated preferred embodiment of the subject invention, actuation of push buttons 17 generates distinct signals indicative of different viewer reactions to displayed programs. Actuation of push button 18 generates a further signal identifying any of the latter distinct signals as indicative of a viewer reaction to an unspecified displayed person. The system 31 shown in FIG. 6 gathers the latter distinct and further signals and identifies the unspecified persons from such gathered signals such as disclosed above with respect to blocks 44, 47, 48 and 49 in FIG. 6.

From another aspect thereof, or in combination with the aspect just discussed, the subject invention specifically identifies viewer reactions in terms of individual viewers. As disclosed above, this may, for instance, be accomplished with the aid of viewer identification equipment including a further push button 19. As disclosed above with the aid of FIG. 2, simultaneous actuation of a further push button 19 and a personally dedicated push button 17 may generate a further signal identifying any of the distinct viewer reaction signals as originating with a particular viewer. These distinct and further signals preferably are also gathered essentially in real time.

Moreover, there preferably is determined for each viewer reaction the channel over which the program watched by the particular viewer is being broadcast. The viewer reactions are then specifically identified in terms of individual viewers and television channels, and preferably also in terms of persons reacted to, as disclosed above with the aid of FIGS. 6 and 7.

Simultaneous actuation of the push button 19 and a dedicated push button 17 preferably generates a first further signal identifying distinct signals generated in the response channels including push button 17 as originating with a particular viewer. Actuation of the push button 18, on the other hand, preferably generates a second signal identifying any of the distinct signals generated in the channels including push button 17 as indicative of a viewer reaction to an unspecified displayed person, which is thereafter identified as explained above with the aid of FIGS. 6 and 7.

Broadly speaking, the subject invention and its disclosed equipment thus provides a number of possible types of reviewer reactions and indicates viewer reactions in terms of these possible types. Distinct first signals representative of indicated viewer reactions are provided in terms of a first criterion, while distinct second signals are provided as representative of indicated viewer reactions in terms of a second criterion. By way of example, the first criterion may be the manner in which viewers react to video displays, such as in terms of the above mentioned viewer reactions E to ZAP. The second criterion may then be the performance of a person displayed in one of the video programs or the identity of a reacting viewer.

The provision of the mentioned second signals may include a modification of the mentioned first signals. In particular, second signals may be provided by qualifying the first signals pursuant to the second criterion, such as with the aid of push button 18 or 19. Additionally, the first signals may be qualified pursuant to a third criterion, and may thus be qualified as signal viewer reactions in terms of a third criterion. For instance, when the second criterion is the identity of a reacting viewer, the third criterion may concern the performance of a person appearing in a video broadcast. Conversely, a generated third signal may be indicative of the identity of a reacting viewer.

Also, where video programs are broadcast over different television channels, viewer reactions may be qualified in terms of the different channels over which the programs watched by reacting viewers are broadcast, as, for instance, explained above with the aid of FIGS. 6 and 7.

In this respect, the subject disclosure and claims employ the words "person," "performance of a person" and expressions of like import generically to cover, for instance, a person's performance, character, persona, appearance or other feature.

From another aspect thereof, the subject invention provides a plurality of input devices 17, 18 and 19 for selective actuation by viewers, and has viewers selectively actuate these input devices, one at a time, to indicate different first viewer reactions, and further has viewers selectively actuate the input devices 17 and 18 or 19, more than one at a time, to indicate different second viewer reactions.

For instance, the step of indicating different first viewer reactions may include having viewers selectively actuate first input devices 17, one at a time, and the step of indicating different second viewer reactions may include having viewers actuate a second input device 18 or 19 simultaneously with each actuated first input device 17. Therefore, input devices may be selectively actuated, one at a time, to indicate general reactions to any of the video programs, and input devices 17 and 18 may be selectively actuated more than one at a time to indicate reactions to specific persons appearing in video programs.

In this respect, viewers may actuate the second input device 18 simultaneously with an input device 17 to indicate reactions to specific persons, as disclosed above with the aid of FIG. 4.

Conversely or additionally, viewers may selectively actuate input devices 17 and 19, more than one at a time, to indicate the identity of reacting viewers. In this respect, viewers may actuate a second or further input device 19 simultaneously with each actuated first input device 17 to indicate the identity of reacting viewers, as disclosed above with the aid of FIG. 2. Also, where the push button 19 represents a second input device, viewers may actuate a third input device 18 to indicate reactions to specific persons appearing in video programs.

The input device at 18 may thus be dedicated as a device for indicating reaction to a person appearing in a displayed video program, while the input device at 19 may be dedicated as a device for identifying a reacting viewer.

It will thus be recognized that the invention meets all of its above mentioned objectives and provides novel viewer reaction systems and features that will have a significant beneficial effect on the most prolific mass medium of the world.

While specific embodiments and inventive aspects have been disclosed herein, the subject extensive disclosure will render apparent or suggest to those skilled in the art various modifications and variations within the spirit and scope of the subject invention.

We claim:

1. In a method of determining viewer reaction to video programs including persons displayed by different video display sets, the improvement comprising in combination the steps of:

providing switching devices for receiving different reactions to said programs;

employing said switching devices for distinctly indicating different viewer reactions to said programs;

generally classifying part of said viewer reactions as reactions to unspecified displayed persons;

gathering said viewer reactions; and identifying said unspecified persons from said gathered viewer reactions.

2. A method as claimed in claim 1, wherein:

said viewer reaction indicating step includes providing a number of possible types of viewer reactions and indicating with said switching devices viewer reactions to said programs in terms of said possible types; and said classifying step including generally classifying part of said viewer reactions as reactions to unspecified persons in terms of said possible types.

3. A method as claimed in claim 1 or 2, wherein:

said unspecified persons are identified by means of a gathering of said viewer reactions in real time within a tolerance corresponding to an average rate of change of said persons in said video programs.

4. A method as claimed in claim 1 or 2, wherein:

said identifying step includes comparing (a) said reactions to unspecified persons timewise to (b) said video programs.

5. A method as claimed in claim 4, wherein:

said gathering and comparing are effected in real time within a tolerance corresponding to an average rate of change of said persons.

6. In a method of determining viewer reaction to video programs including persons displayed by different video display sets, the improvement comprising in combination the steps of:

generating distinct electric signals indicative of different viewer reactions to said programs;

generating a further electric signal identifying any of said distinct signals as indicative of a viewer reaction to an unspecified displayed person;

gathering said distinct and further signals; and identifying said unspecified person from said gathered signals.

7. A method as claimed in claim 6, wherein:

said unspecified persons are identified by means of a gathering of said signals in real time within a tolerance corresponding to an average rate of change of said persons in said video programs.

8. A method as claimed in claim 6 or 7, wherein:

said identifying step includes comparing (a) said reaction to an unspecified person timewise to (b) said video programs.

9. In a method of determining viewer reaction to video programs displayed by different video display sets, the improvement comprising in combination the steps of:

providing on/off type push buttons;

distinctly indicating viewer reactions originating with individual viewers; and specifically identifying said viewer reactions in terms of said individual viewers, by having viewers each viewer selectively and simultaneously actuate more than one of said push buttons at a time.

10. A method as claimed in claim 9, wherein:

said viewer reaction indicating step includes providing a number of possible types of viewer reactions and indicating viewer reactions to said programs in terms of said possible types.

11. In a method of determining viewer reaction to video programs displayed by different video display sets, the improvement comprising in combination the steps of:

generating distinct electric signals indicative of different viewer reactions to said programs;

generating a further electric signal identifying any of said distinct signals as originating with a particular viewer; and gathering said distinct and further signals essentially in real time by instantly transmitting each viewer reaction over a transmission channel to a remote location.

12. In a method of determining viewer reaction to video programs broadcast over different television channels and displayed by different video display sets, the improvement comprising in combination the steps of:

providing switching devices for receiving different reactions to said programs;

employing said switching devices for distinctly indicating viewer reactions originating with individual viewers;

determining for each viewer reaction the channel over which the program watched by the particular viewer is being broadcast;

specifically identifying said viewer reactions in terms of said individual viewers and television channels; and gathering said viewer reactions essentially in real time by instantly transmitting each viewer reaction over a transmission channel to a remote location.

13. A method as claimed in claim 12, wherein:

said viewer reaction indicating step includes providing a number of possible types of viewer reactions and indicating with said switching devices viewer reactions to said programs in terms of said possible types.

14. In a method of determining viewer reaction to video programs including persons displayed to participating viewers by different video display sets, the improvement comprising in combination the steps of:

providing switching devices for receiving different reactions to said programs;

employing said switching devices for distinctly indicating viewer reactions originating with individual viewers;

specifically identifying said viewer reactions in terms of said individual viewers;

generally classifying part of said viewer reactions as reactions to unspecified displayed persons; and identifying said unspecified persons from said classified part of said viewer reactions.

15. A method as claimed in claim 14, wherein:

said viewer reaction indicating step includes providing a number of possible types of viewer reactions and indicating with said switching devices viewer reactions to said programs in terms of said possible types; and said classifying step includes generally classifying part of said viewer reactions as reactions to unspecified persons in terms of said possible types.

16. A method as claimed in claim 14 or 15, wherein:

said unspecified persons are identified by means of a gathering of said viewer reactions in real time within a tolerance corresponding to an average rate of change of said persons in said video programs.

17. A method as claimed in claim 14 or 15, wherein:

said identifying step includes comparing (a) said reactions to unspecified persons timewise to (b) said video programs.

18. A method as claimed in claim 17, wherein:

said unspecified persons are identified by means of a gathering of said viewer reactions in real time within a tolerance corresponding to an average rate of change of said persons.

19. In a method of determining viewer reaction to video programs including persons displayed by different video display sets, the improvement comprising in combination the steps of:

generating distinct electric signals indicative of different viewer reactions to said programs;

generating a first further electric signal identifying any of said distinct signals as originating with a particular viewer;

generating a second further electric signal identifying any of said distinct signals as indicative of a viewer reaction to an unspecified displayed person; and identifying said unspecified persons from said second further signal.

20. A method as claimed in claim 19, wherein:

said signals are gathered in real time within a tolerance corresponding to an average rate of change of said persons in said video programs.

21. A method as claimed in claim 19 or 20, wherein:

said identifying step includes comparing (a) said reaction to an unspecified person timewise to (b) said video programs.

22. In a method of determining viewer reaction to video programs including persons and being broadcast over different television channels and displayed by different video display sets, the improvement comprising in combination the steps of:

providing switching devices for receiving different reactions to said programs;

employing said switching devices for distinctly indicating viewer reactions originating with individual viewers;

determining for each viewer reaction the channel over which the program watched by the particular viewer is being broadcast;

generally classifying part of said viewer reactions as reactions to unspecified displayed persons; and specifically identifying said viewer reactions and unspecified persons in terms of said individual viewers and said television channels.

23. A method as claimed in claim 22, wherein:

said viewer reaction indicating step includes providing a number of possible types of viewer reactions and indicating with said switching devices viewer reactions to said programs in terms of said possible types.

24. A method as claimed in claim 22 or 23, wherein:

said unspecified persons are identified by means of a gathering of said viewer reactions in real time within a tolerance corresponding to an average rate of change of said persons in said video programs.

25. In a method of determining, in terms of different criteria, viewer reaction to video programs displayed by different video display sets, the improvement comprising in combination the steps of:

providing a number of possible types of viewer reactions and indicating viewer reactions in terms of said possible types;

providing distinct first electric signals representative of said indicated viewer reactions in terms of a first criterion; and providing distinct second electric signals representative of said indicated viewer reactions in terms of a second criterion, including the step of expressing said second signals in terms of a reaction to the performance of a person displayed in one of said video programs.

26. A method as claimed in claim 25, wherein:

said provision of second signals includes a modification of said first signals.

27. A method as claimed in claim 25, wherein:

said second signals are provided by qualifying said first signals pursuant to said second criterion.

28. A method as claimed in claim 25 or 27, including the step of:

qualifying said first signals pursuant to a third criterion as signal viewer reactions in terms of said third criterion.

29. A method as claimed in claim 25, 26 or 27, including the step of:

providing a third signal indicative of the identity of a reacting viewer.

30. A method as claimed in claim 25, 26 or 27, wherein:

said second criterion is the identity of a reacting viewer.

31. A method as claimed in claim 25, 26 or 27, wherein:

said video programs are broadcast over different television channels; and said viewer reactions are qualified in terms of the different channels over which the programs watched by reacting viewers are broadcast.

32. In a method of determining viewer reaction to video programs displayed by different video display sets, the improvement comprising in combination the steps of:

providing a plurality of input devices for selective actuation by viewers;

having viewers selectively actuate said input devices, one at a time, to indicate different first viewer reactions; and having viewers selectively actuate said input devices, more than one at a time, to indicate different second viewer reactions.

33. A method as claimed in claim 32, wherein:

said step of indicating different first viewer reactions includes having viewers selectively actuate first input devices, one at a time; and said step of indicating different second viewer reactions includes having viewers actuate a second input device simultaneously with each actuated first input device.

34. A method as claimed in claim 32, wherein:

said step of indicating different first viewer reactions includes having viewers selectively actuate said input devices, one at a time, to indicate general reactions to any of said video programs; and said step of indicating different second viewer reactions includes having viewers selectively actuate said input devices, more than one at a time, to indicate reactions to specific persons appearing in said video programs.

35. A method as claimed in claim 32, wherein:

said step of indicating different first viewer reactions includes having viewers selectively actuate first input devices, one at a time, to indicate general reactions to any of said video programs; and said step of indicating different second viewer reactions includes having viewers actuate a second input device simultaneously with each actuated first input device to indicate reactions to specific persons appearing in said video programs.

36. A method as claimed in claim 32, wherein:

said step of indicating different first viewer reactions includes having viewers selectively actuate said input devices, one at a time, to indicate general reactions to any of said video programs; and said step of indicating different second viewer reactions includes having viewers selectively actuate said input devices, more than one at a time, to indicate the identity of reacting viewers.

37. A method as claimed in claim 32, wherein:

said step of indicating different first viewer reactions includes having viewers selectively actuate first input devices, one at a time, to indicate general reactions to any of said video programs; and said step of indicating different second viewer reactions includes having viewers actuate a second input device simultaneously with each actuated first input device to indicate the identity of reacting viewers.

38. A method as claimed in claim 37, including the step of:

having viewers actuate a third input device simultaneously with each actuated first input device to indicate reactions to specific persons appearing in said video programs.

39. A method as claimed in claim 32, 33, 34, 35, 36, 37 or 38, wherein:

said video programs are broadcast over different television channels; and said viewer reactions are qualified in terms of the different channels over which the programs watched by reacting viewers are broadcast.

40. In apparatus for determining viewer reaction to video programs including persons displayed by different video display sets, the improvement comprising in combination:

means for distinctly indicating different viewer reactions to said programs;

means connected to said indicating means for generally classifying part of said viewer reactions as reactions to unspecified displayed persons;

means connected to said indicating and classifying means for gathering said viewer reactions; and means connected to said gathering means for identifying said unspecified persons from said gathered viewer reactions.

41. Apparatus as claimed in claim 40, wherein:

said indicating means include means for indicating viewer reactions to said programs in terms of a number of possible types of viewer reactions; and said classifying means include means for generally classifying part of said viewer reactions as reactions to unspecified persons in terms of said possible types.

42. Apparatus as claimed in claim 40 or 41; wherein:

said identifying means and said gathering means for gathering said viewer reactions in real time within a tolerance corresponding to an average rate of change of said in said video programs.

43. Apparatus as claimed in claim 40 or 41, wherein:

said identifying means include means for comparing (a) said reactions to unspecified persons timewise to (b) said video programs.

44. Apparatus as claimed in claim 42, wherein:

said gathering means and said comparing means include means for effecting said gathering and comparing in real time within a tolerance corresponding to an average rate of change of said persons.

45. In apparatus for determining viewer reaction to video programs including persons displayed by different video display sets, the improvement comprising in combination:

means for generating distinct signals indicative of different viewer reactions to said programs and for generating a further signal identifying any of said distinct signals as indicative of a viewer reaction to an unspecified displayed person;

means connected to said generating means for gathering said distinct further signals; and means connected to said gathering means for identifying said unspecified persons from said gathered signals.

46. Apparatus as claimed in claim 45, wherein:

said identifying means and said gathering means include means for gathering said signals in real time within a tolerance corresponding to an average rate of change of said persons in said video programs.

47. Apparatus as claimed in claim 45 or 46, wherein:

said identifying means include means for comparing (a) said reaction to an unspecified person timewise to (b) said video programs.

48. In apparatus for determining viewer reaction to video programs displayed by different video display sets, the improvement comprising:

means for generating distinct signals indicative of different viewer reactions to said programs;

means combined with said generating means for generating a further signal identifying any of said distinct signals as originating with a particular viewer; and means connected to said means for generating distinct signals and said means for generating a further signal for gathering said distinct and further signals essentially in real time including means for instantly transmitting each viewer reaction over a transmission channel to a remote location.

49. In apparatus for determining viewer reaction to video programs broadcast over different television channels and displayed by different video display sets, the improvement comprising in combination:

means for distinctly indicating viewer reactions originating with individual viewers;

means for determining for each viewer reaction the channel over which the program watched by the particular viewer is being broadcast;

means connected to said indicating and determining means for specifically identifying said viewer reactions in terms of said individual viewers and television channels; and means for gathering said viewer reactions essentially in real time including means for instantly transmitting each viewer reaction over a transmission channel to a remote location.

50. Apparatus as claimed in claim 49, wherein:

said indicating means include means for indicating viewer reactions to said programs in terms of a number of possible types of viewer reactions.

51. In apparatus for determining viewer reaction to video programs including persons displayed to participating viewers by different video display sets, the improvement comprising in combination:

means for distinctly indicating viewer reactions originating with individual viewers;

means for specifically identifying said viewer reactions in terms of said individual viewers;

means for generally classifying part of said viewer reactions as reactions to unspecified displayed persons; and means connected to said classifying means for identifying said unspecified persons from said classified part of said viewer reactions.

52. Apparatus as claimed in claim 51, wherein:

said indicating means include means for indicating viewer reactions to said programs in terms of a number of possible types of viewer reactions; and said classifying means include means for generally classifying part of said viewer reactions as reactions to unspecified persons in terms of said possible types.

53. Apparatus as claimed in claim 51 or 52, wherein:

said identifying means include means for gathering said viewer reactions in real time within a tolerance corresponding to an average rate of change of said persons in said video programs.

54. Apparatus as claimed in claim 51 or 52, wherein:

said identifying means include means for comparing (a) said reactions to unspecified persons timewise to (b) said video programs.

55. Apparatus as claimed in claim 54, wherein:

said identifying means include means for gathering said viewer reactions in real time within a tolerance corresponding to an average rate of change of said persons.

56. In apparatus for determining viewer reaction to video programs including persons displayed by different video display sets, the improvement comprising in combination:

means for generating distinct signals indicative of different viewer reactions to said programs, for generating a first further signal identifying any of said distinct signals as originating with a particular viewer and for generating a second further signal identifying any of said distinct signals as indicative of a viewer reaction to an unspecified displayed person; and means connected to said generating means for identifying said unspecified persons from said second further signals.

57. Apparatus as claimed in claim 56, wherein:

said identifying means include means for gathering said distinct and further signals in real time within a tolerance corresponding to an average rate of change of said persons in said video programs.

58. Apparatus as claimed in claim 56 or 57, wherein:

said identifying means include means for comparing (a) said reaction to an unspecified person timewise to (b) said video programs.

59. In apparatus for determining viewer reaction to video programs including persons being broadcast over different television channels and displayed by different video display sets, the improvement comprising in combination:

means for distinctly indicating viewer reactions originating with individual viewers;

means for determining for each viewer reaction the channel over which the program watched by the particular viewer is being broadcast;

means for generally classifying part of said viewer reactions as reactions to unspecified displayed persons; and means connected to said indicating, determining and classifying means for specifically identifying said viewer reactions and unspecified persons in terms of said individual viewers and said television channels.

60. Apparatus as claimed in claim 59, wherein:

said indicating means include means for indicating viewer reactions to said programs in terms of a number of possible types of viewer reactions.

61. Apparatus as claimed in claim 59 or 60, wherein:

said identifying means include means for gathering said viewer reactions in real time within a tolerance corresponding to an average rate of change of said persons in said video programs.

62. In apparatus for determining, in terms of different criteria, viewer reaction to video programs displayed by different video display sets, the improvement comprising in combination:

means for indicating viewer reactions in terms of number of possible types of viewer reactions;

means connected to said indicating means for providing distinct first signals representative of said indicated viewer reactions in terms of a first criterion, and means connected to said indicating means for providing distinct second signals representative of said indicated viewer reactions in terms of a second criterion, including means for expressing said second signals in terms of a reaction to the performance of a person displayed in one of said video programs.

63. Apparatus as claimed in claim 62, wherein:

said means for providing second signals include means for modifying said first signals.

64. Apparatus as claimed in claim 62, wherein:

said means for providing second signals include means for qualifying said first signals pursuant to said second criterion.

65. Apparatus as claimed in claim 62 or 63, including:

means for qualifying said first signals pursuant to a third criterion as signal viewer reactions in terms of said third criterion.

66. Apparatus as claimed in claim 62, 63 or 64, including:

means for providing a third signal indicative of the identity of a reacting viewer.

67. Apparatus as claimed in claim 62, 63 or 64, wherein:

said means for providing said second signals include means for expressing said second signals in terms of a second criterion concerning the identity of a reacting viewer.

68. Apparatus as claimed in claim 62, 63 or 64, wherein:

said video programs are broadcast over different television channels; and said apparatus includes means for qualifying said viewer reactions in terms of the different channels over which the programs watched by reacting viewers are broadcast.

69. In apparatus for determining viewer reaction to video programs displayed by different video display sets, the improvement comprising in combination:

a plurality of input devices for selective actuation by viewers;

means connected to said input devices for indicating different first viewer reactions in response to actuation of said input devices, one at a time; and means connected to said input devices for indicating different second viewer reactions in response to actuation of more than one of said input devices at a time.

70. Apparatus as claimed in claim 69, wherein:
said input devices include first input devices and a distinct second input device;
said means for indicating different first viewer reactions include means for indicating said first viewer reactions in response to selective actuation of said first input devices, one at a time; and
said means for indicating different second viewer reactions includes means for indicating said second viewer reactions in response to actuation of said second input device simultaneoulsy with each actuated first input device.

71. Apparatus as claimed in claim 70, wherein:
said second input device is dedicated as a device for identifying a reacting viewer.

72. Apparatus as claimed in claim 70, wherein:
said second input device is dedicated as a device for indicating reaction to a person appearing in a displayed video program.

73. Apparatus as claimed in claim 70, wherein:
said means for indicating different second viewer reactions include means for indicating a reaction to a person appearing in a video program, in response to actuation of said second input device simultaneously with a first input device.

74. Apparatus as claimed in claim 70, wherein:
said means for indicating different second viewer reactions include means for indicating the identity of reacting viewers in response to actuation of said second input device simultaneously with a first input device.

75. Apparatus as claimed in claim 74, including:
a third input device actuable simultaneously with a first input device for indicating reactions to specific persons appearing in said video programs.

76. Apparatus as claimed in claim 69, 70, 71, 72, 73, 74 or 75, wherein:
said video programs are broadcast over different television channels; and
said apparatus include means for qualifying said viewer reactions in terms of the different channels over which the programs watched by reacting viewers are broadcast.

77. In a unit for receiving viewer reactions to video programs, the improvement comprising in combination:
a series of switching devices for receiving a number of possible types of viewer reactions; and
a further switching device for indicating that any of said viewer reactions is a reaction to a person appearing in any of said video programs.

78. A unit as claimed in claim 77, including:
a second further switching device for indicating that any of said viewer reactions originates with identified viewers.

79. A unit as claimed in claim 78, including:
means for individually designating at least some of the switching devices in said series in terms of individual viewers using said unit.

80. A unit as claimed in claim 77, 78 or 79, wherein:
said switching devices are push buttons.

81. A unit as claimed in claim 77, 78 or 79, including:
means for selecting video program transmission channels for said video programs.

* * * * *